(12) United States Patent
Yoshizawa

(10) Patent No.: US 8,794,752 B2
(45) Date of Patent: Aug. 5, 2014

(54) INKJET PRINTER

(75) Inventor: Fumiyoshi Yoshizawa, Hamamatsu (JP)

(73) Assignee: Roland DG Corporation, Hamamatsu-Shi, Shizuoka-Ken (JP)

( * ) Notice: Subject to any disclaimer, the term of this patent is extended or adjusted under 35 U.S.C. 154(b) by 427 days.

(21) Appl. No.: 13/211,198

(22) Filed: Aug. 16, 2011

(65) Prior Publication Data

US 2012/0069080 A1  Mar. 22, 2012

(30) Foreign Application Priority Data

Sep. 21, 2010 (JP) .................................. 2010-211281

(51) Int. Cl.
*B41J 2/01* (2006.01)
*B41J 2/21* (2006.01)

(52) U.S. Cl.
CPC . *B41J 2/01* (2013.01); *B41J 2/2107* (2013.01)
USPC ................................ 347/100; 347/95; 347/96

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ..................... 347/100, 95, 96, 88, 99, 20, 21; 106/31.6, 31.27, 31.13; 523/160, 161
See application file for complete search history.

(56) References Cited

U.S. PATENT DOCUMENTS

| | | | |
|---|---|---|---|
| 5,502,304 A * | 3/1996 | Berson et al. ................. | 250/271 |
| 5,693,693 A * | 12/1997 | Auslander et al. ......... | 106/31.21 |
| 2004/0179078 A1* | 9/2004 | Gundjian et al. ................ | 347/96 |
| 2005/0093948 A1* | 5/2005 | Morris et al. .................. | 347/100 |
| 2008/0149894 A1* | 6/2008 | Auslander et al. ................ | 347/1 |

FOREIGN PATENT DOCUMENTS

JP  9131860  5/1997
JP  200895102  4/2008

OTHER PUBLICATIONS

Japan Patent Office Application Serial No. 2010-211281, Office Action dated Mar. 28, 2014, 2 pages.

* cited by examiner

*Primary Examiner* — Manish S Shah
(74) *Attorney, Agent, or Firm* — Lee, Hong, Degerman, Kang & Waimey

(57) ABSTRACT

According to one embodiment, an inkjet printer includes an inkjet head for discharging each of a plurality of visible color inks onto a medium and discharging at least one fluorescent ink onto only portions of the medium when printing an image onto the medium, such that at least a first visible color ink of the plurality of visible color inks is discharged onto the portions of the medium, and at least a second visible color ink of the plurality of visible color inks is not discharged onto the portions of the medium. The plurality of visible color inks reflect light at respective wavelength ranges of the visible color inks. The at least one fluorescent ink reflects light at a wavelength range that is the same as a wavelength range of at least one of the plurality of visible color inks discharged from the inkjet head.

15 Claims, 4 Drawing Sheets

INKJET PRINTER

CROSS-REFERENCE TO RELATED APPLICATIONS

Pursuant to 35 U.S.C. §119(a), this application claims the benefit of earlier filing date and right of priority to Japanese Application No. 2010-211281, filed on Sep. 21, 2010, the contents of which is hereby incorporated by reference herein in its entirety.

FIELD OF THE INVENTION

The present invention relates to an ink jet printer, and more specifically, to an inkjet printer printing color images on media.

BACKGROUND OF THE INVENTION

Conventionally known inkjet printers include paper moving type inkjet printers and flatbed type inkjet printers. Paper moving type inkjet printers use ink heads that move in a primary scanning direction to print on media carried in an auxiliary scanning direction (perpendicular to the primary scanning direction) by a carrier device. Flatbed type inkjet printers use ink heads that move freely in the primary scanning direction and auxiliary scanning direction to print on the media. In these conventional inkjet printers, color inks of various colors are discharged from moving ink heads onto the media to perform color printing on the media.

In the color printing process using the inkjet printers described above, visible color inks, also called process color inks, such as cyan (C), magenta (M), yellow (Y) and black (K) which reflect light in their respective wavelength ranges, are generally used. The visible color inks in various colors are discharged from their individual ink heads for color printing to take place.

However, the brightness of the images printed in color using the visible color inks or process color inks is limited because of the limited brightness of the visible color inks. The problem lies in that the brightness of a combination of process colors cannot exceed a certain threshold. For example, even if a user feels that the brightness of an image is lacking upon viewing a finished piece of printed media, the brightness of the image beyond what is inherent in each of the visible color inks cannot be obtained.

As such, a color inkjet printer that can enhance the brightness of a printed color image is desired.

SUMMARY OF THE INVENTION

The present invention is directed to an inkjet printer printing color images on media. The present invention was conceived in view of the problems of the conventional technology described above, and it is an object to provide an inkjet printer that can visually enhance brightness of images printed on media.

In order to achieve the object described above, in accordance with the present invention, visible color inks and a clear fluorescent ink, which reflects light in the same wavelength range as the visible color inks, are discharged when printing images on the media. The present invention has a remarkable effect of visually enhancing the brightness of images printed in color on media using visible color inks without resulting in any significant device enlargement or cost increase.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in an inkjet printer for printing an image on a medium, the inkjet printer comprising an inkjet head for discharging at least one of a plurality of visible color inks and at least one fluorescent ink onto a medium when printing an image onto the medium. The plurality of visible color inks reflect light at respective wavelength ranges of the visible color inks, and the at least one fluorescent ink reflects light at a wavelength range that is the same as a wavelength range of at least one of the plurality of visible color inks.

In one embodiment, the plurality of visible color inks comprises cyan visible color ink, magenta visible color ink, yellow color ink, and black color ink. In another embodiment, the at least one fluorescent ink reflects light at each of the respective wavelength ranges of the plurality of visible color inks. In a further embodiment, the at least one fluorescent ink reflects light at a wavelength range that is the same as a wavelength range of only one of the plurality of visible color inks. In a further embodiment, the at least one fluorescent ink comprises a transparent fluorescent ink or a colored fluorescent ink.

In another embodiment, when printing the image onto the medium, the at least one of the plurality of visible color inks is discharged onto the medium, and the at least one fluorescent ink is discharged onto the medium printed with the at least one of the plurality of visible color inks. In an alternative embodiment, when printing the image onto the medium, the at least one of the plurality of visible color inks and the at least one fluorescent ink is discharged onto the medium at the same time. In a further embodiment, the plurality of visible color inks and the at least one fluorescent ink are ultraviolet curable inks.

In another embodiment, a method for printing an image on a medium comprises discharging at least one of a plurality of visible color inks and at least one fluorescent ink onto a medium when printing an image onto the medium, wherein the plurality of visible color inks reflect light at respective wavelength ranges of the visible color inks, and wherein the at least one fluorescent ink reflects light at a wavelength range that is the same as a wavelength range of at least one of the plurality of visible color inks.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an inkjet printer printing color images on media.

In accordance with embodiments of the present invention, the term "media" may refer to various recording media made of paper such as plain paper, as well as resin materials such as PVC and polyester and other materials such as aluminum, iron, and wood.

In accordance with embodiments of the present invention, a width direction of media may be referred to as a "primary scanning direction," and a longitudinal direction of the media may be referred to as an "auxiliary scanning direction." The primary scanning direction, which is the media's width direction, and the auxiliary scanning direction, which is the media's longitudinal direction, are orthogonal to each other.

In accordance with embodiments of the present invention, an "inkjet method" refers to a printing method based on inkjet technologies using various conventional known techniques, including various types of continuous methods such as a binary deflection method or a continuous deflection method, and various on-demand methods, such as, a thermal method, a piezoelectric element method and the like.

An example of an inkjet printer in accordance with an embodiment of the invention will be described below in detail with references to the accompanying drawings.

Figure 1:
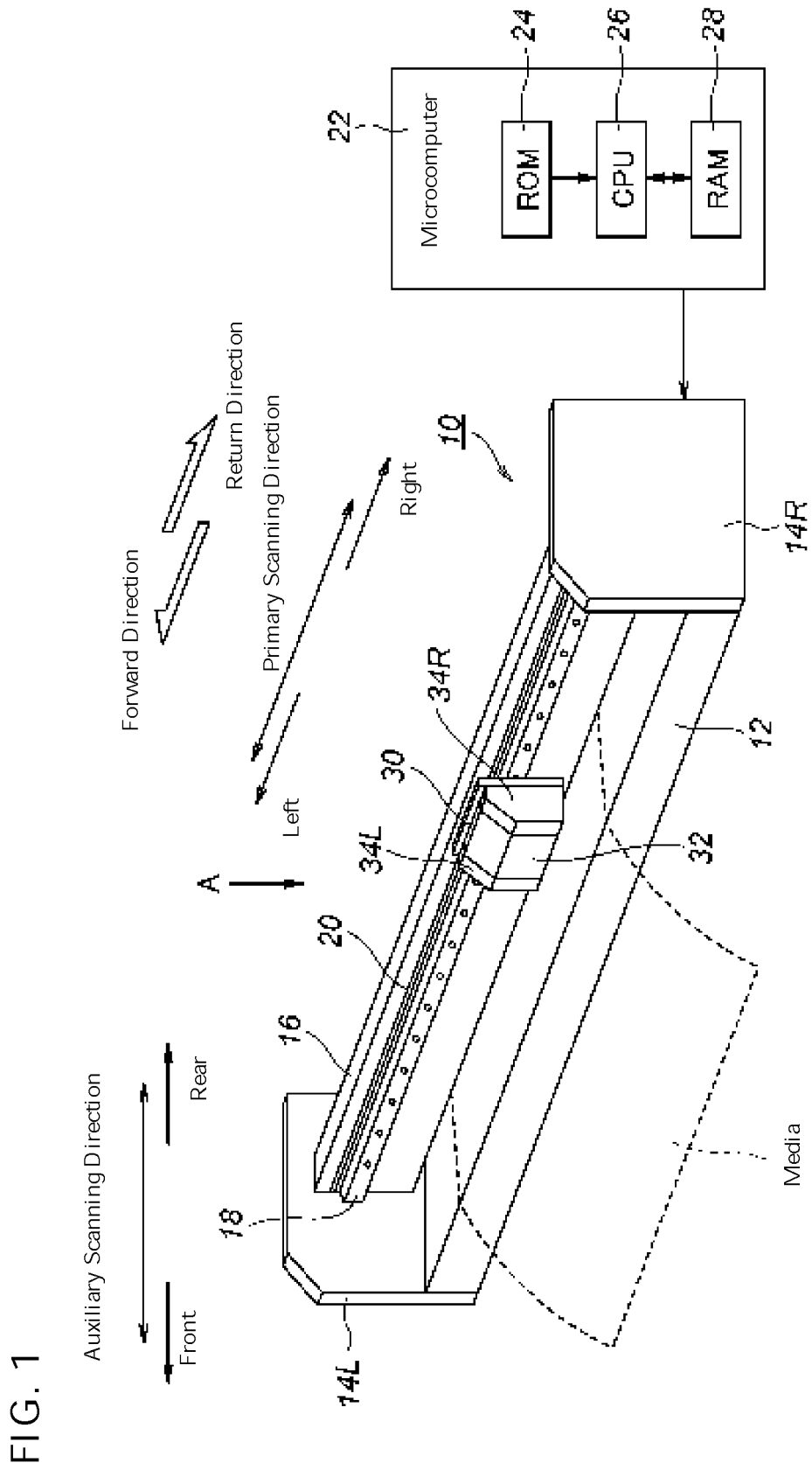
FIG. 1 is a schematic perspective view illustrating the configuration of an inkjet printer in accordance with an embodiment of the present invention.

FIG. 1 is a schematic perspective view illustrating the configuration of an inkjet printer in accordance with an embodiment of the present invention. An inkjet printer 10 shown in FIG. 1 is a paper moving type inkjet printer that prints, using ink heads that move in the primary scanning direction relative to a medium that is carried in the auxiliary scanning direction.

The inkjet printer 10 comprises a fixed-type base member 12 disposed to extend in the primary scanning direction, side members 14L, 14R disposed orthogonally to the base member 12 at left and right ends of the base member 12, a center wall 16 that connects the two side members 14L, 14R, a guide rail 18 disposed to extend in the primary scanning direction in front of the center wall 16, a wire 20 disposed in parallel with the wall surface of the center wall 16 in a freely movable manner in the primary scanning direction, a carriage 30 mounted in a freely slidable manner on the guide rail and disposed fixed to the wire 20, and a motor (not shown) that winds the wire 20 to move it in the primary scanning direction.

The overall operations of the inkjet printer 10 including drive control of the motor (not shown) that winds the wire 20 are controlled by a microcomputer 22. The carriage 30 moves to the right and to the left along the primary scanning direction on the guide rail 18 as the wire 20 moves.

Figure 2:
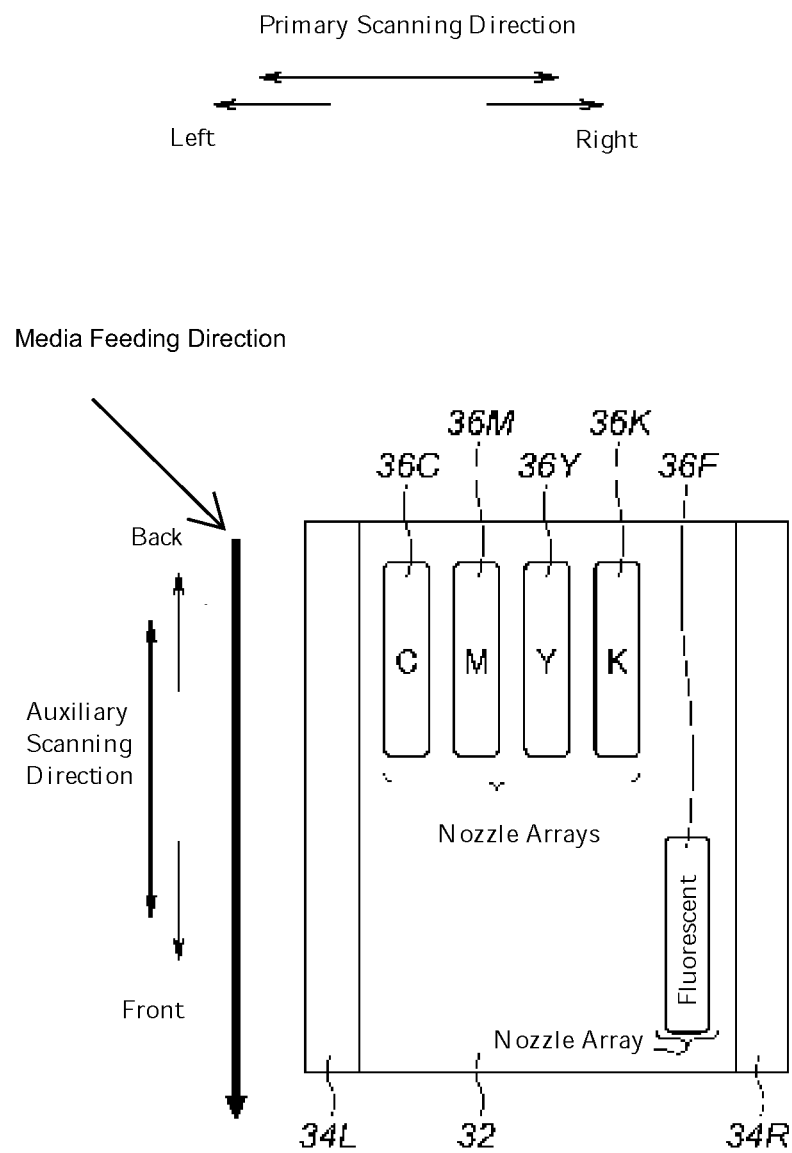
FIG. 2 is a schematic diagram illustrating an ink head arrangement in an inkjet printer in accordance with an embodiment of the present invention.

Referring to FIGS. 1 and 2, on the carriage 30 an ink head holder 32 is mounted that contains an ink head 36C that discharges cyan visible color ink from a nozzle array, an ink head 36M that discharges magenta visible color ink from a nozzle array, an ink head 36Y that discharges yellow visible color ink from a nozzle array, an ink head 36K that discharges black visible color ink from a nozzle array, and an ink head 36F that discharges clear fluorescent ink from a nozzle array. An ultraviolet irradiation lamp 34R is placed to the right in the primary scanning direction relative to the ink holder 32. An ultraviolet irradiation lamp 34L is placed to the left in the primary scanning direction relative to the ink holder 32.

A group of operators, not shown, for inputting instructions desired by the user is disposed on the inkjet printer 10, and various settings entered by operating the group of operators are processed by the microcomputer 22 and stored in predetermined areas of a random access memory (RAM) 28 as information to be used in various processes for printing to be realized by the microcomputer 22.

Referring to FIG. 1, the microcomputer 22 comprises a central processing unit (CPU) 26 for executing processes according to a program stored in a read-only memory (ROM) 24. The ROM 24 includes a set program storage section that stores programs for various processes executed by the CPU 26. The random access memory (RAM) 28 includes set working areas for storing various types of data used for operating the inkjet printer 10 based on controls by the CPU 26. The CPU 26 executes programs that realize various types of processes in color print processing realized by the microcomputer 22, i.e., processing for managing all procedures for printing.

Referring to FIG. 2, the ink heads 36C, 36M, 36Y, 36K, 36F included in the ink head holder 32 will be described. FIG. 2 is a schematic diagram illustrating an ink head arrangement in an inkjet printer in accordance with an embodiment of the present invention. In FIG. 2, the nozzle array of each of the ink heads 36C, 36M, 36Y, 36K and 36F of the inkjet printer 10 is conceptually shown as seen from the direction of arrow A in FIG. 1.

The nozzle array of each of the ink heads 36C, 36M, 36Y, 36K and 36F is disposed on the side facing the medium, and visible color ink or clear fluorescent ink corresponding to each of the ink heads 36C, 36M, 36Y, 36K and 36F is discharged onto the medium from the nozzle arrays.

As shown in FIG. 2, the nozzle arrays of the respective ink heads 36C, 36M, 36Y, 36K and 36F are disposed sequentially from the left side in the primary scanning direction. The nozzle arrays of the respective ink heads 36C, 36M, 36Y and 36K are sequentially disposed in a line along the primary scanning direction without any offset to the fore or rear in the auxiliary scanning direction. However, the nozzle array of the ink head 36F is placed offset to the front in the auxiliary scanning direction relative to the nozzle array of the respective ink heads 36C, 36M, 36Y and 36K.

Figure 3:
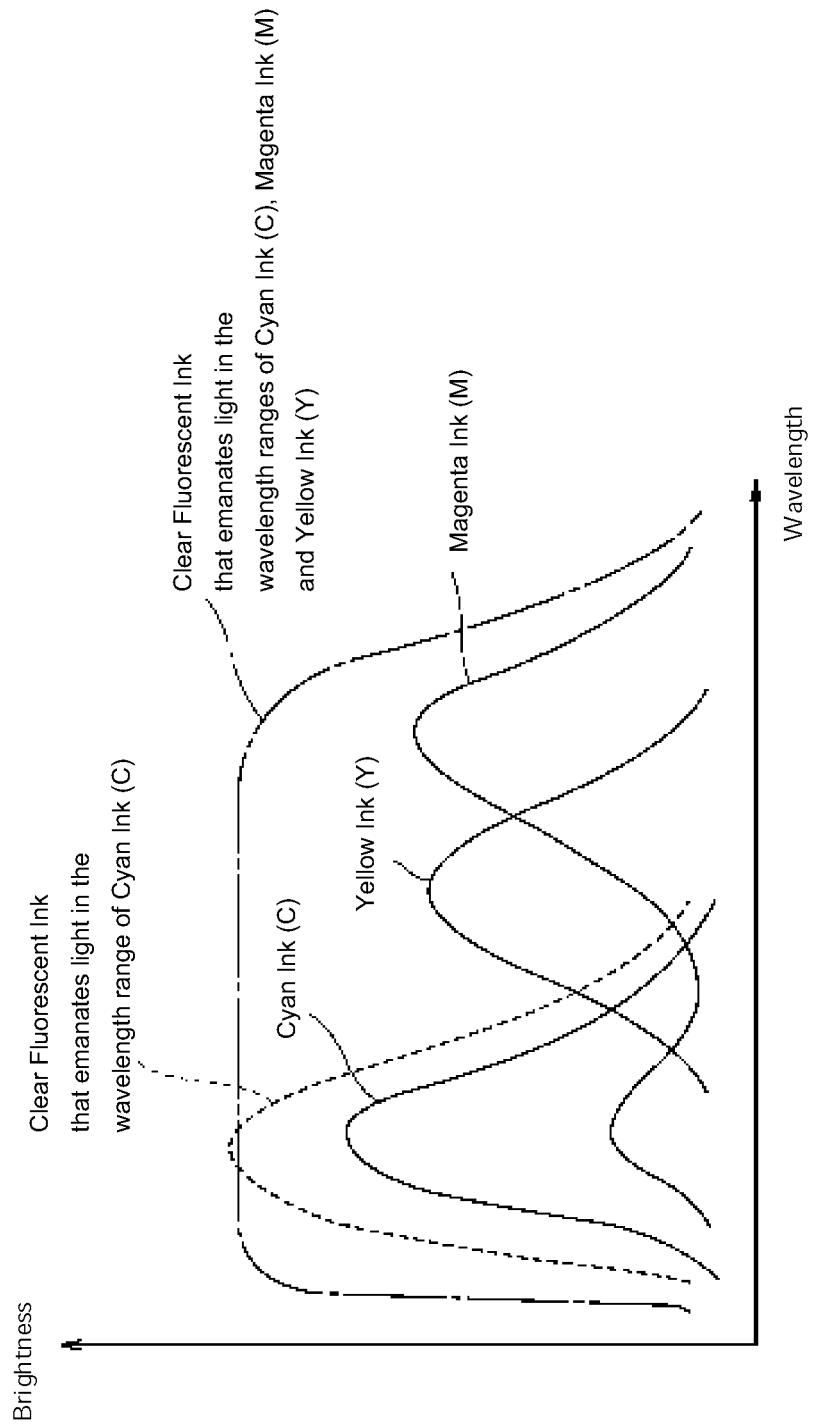
FIG. 3 is a graph illustrating the relationship between the brightness of various inks and wavelength ranges of their emitted lights in accordance with an embodiment of the present invention.

Referring to FIG. 3, the visible color inks and the clear fluorescent ink discharged from the nozzle array of each of the ink heads 36C, 36M, 36Y, 36K and 36F will be described. In accordance with an embodiment of the present invention, the visible color inks and clear fluorescent ink are ultraviolet curable inks, in which curing is promoted by ultraviolet irradiation.

Each of the visible color inks discharged from their respective ink heads 36C, 36M, 36Y and 36K possesses a predetermined brightness by reflecting light in a predetermined wavelength range (see solid lines in FIG. 3). However, the colorless, clear fluorescent ink discharged from the ink head 36F reflects light together with the visible color inks for all wavelength ranges associated with the visible color inks discharged from the respective ink heads 36C (cyan ink (C)), 36M (magenta ink (M)) and 36Y (yellow ink (Y)) (see the dot-and-dash line in FIG. 3). As such, brightness is enhanced compared to a case where only the visible color inks are discharged. In accordance with an embodiment of the invention, the fluorescent ink may be a colored fluorescent ink, and not necessarily colorless.

In accordance with an embodiment of the present invention, color printing processing by the inkjet printer 10 will be described below. To perform color printing by the inkjet printer 10, ink is discharged onto a carried medium, from each of the ink heads 36C, 36M, 36Y, 36K and 36F controlled by the microcomputer 22 based on the user's instructions inputted through the group of operators. An ultraviolet ray radiates from the ultraviolet lamps 34R and 34L onto the discharged inks to ultraviolet-cure the inks on the medium to fix the inks on the medium.

In accordance with an embodiment of the present invention, CMYK visible color inks are discharged from nozzle arrays of the ink heads 36C, 36M, 36Y and 36K onto a medium carried forward in the auxiliary scanning direction from an original position. An ultraviolet ray then radiates from the ultraviolet lamps 34R and 34L onto the discharged CMYK visible color inks to ultraviolet-cure the CMYK visible color inks.

When the nozzle array of the ink head 36F is positioned over the visible color inks cured on the medium as the medium is carried forward in the auxiliary scanning direction, the clear fluorescent ink is discharged from the nozzle array of the ink head 36F onto the visible color inks cured on the medium. An ultraviolet ray then radiates from the ultraviolet lamps 34R and 34L onto the discharged clear fluorescent ink to ultraviolet-cure the clear fluorescent ink.

The process described above is performed sequentially to discharge the clear fluorescent ink over all visible color inks cured on the medium in order to perform color printing of a desired image on the medium. Consequently, according to an embodiment of the present invention where the clear fluorescent ink is discharged onto the visible color inks, the clear fluorescent ink reflects light together with the visible color inks in an entire wavelength range of light of which each of the visible color inks (cyan ink (C), magenta ink (M) and yellow ink (Y)) reflects, such that the brightness of images formed on the media is visually improved compared to color printing where only the visible color inks are discharged.

Further, according to an embodiment of the present invention, since the clear fluorescent ink is printed on the surface of the image formed by the visible color inks, scratching and fading of the image formed with the visible color inks is prevented. Moreover, a glossy finish is provided to the surface of the image.

In accordance with an embodiment of the present invention, the ultraviolet ray is not necessarily radiated onto the visible color inks between the time when the CMYK visible color inks are discharged from the nozzle arrays of the ink heads 36C, 36M, 36Y and 36K and the time when the clear fluorescent ink is discharged from the nozzle array of the ink head 36F. Alternatively, the ultraviolet ray may be radiated onto the visible color inks and clear fluorescent ink only after the clear fluorescent ink is discharged from the nozzle array of the ink head 36F.

In accordance with an embodiment of the present invention, as previously described, a clear fluorescent ink that can emanate light over an entire absorption wavelength range of the various visible color inks is used to increase the brightness of a printed image. However, in another embodiment, the present invention is not limited to such an ink. As shown by the broken line in FIG. 3, by using a clear fluorescent ink that reflects and emanates light in a specific wavelength range, the brightness of a specific visible color ink that reflects light in the specific wavelength range (for example, cyan ink (C)) may be heightened. Thus, a clear fluorescent ink that reflects and emanates light in a specific wavelength range may be prepared for each visible color ink, or a plurality of clear fluorescent inks may be used alone or in combination by appropriately mixing them. Further, the clear fluorescent ink may be colored or colorless.

In accordance with an embodiment of the present invention, referring to the dot-and-dash line in FIG. 3, a clear fluorescent ink that can increase the brightness of all colors of visible color inks is printed over the entire image printed in advance with the visible color inks. However, in another embodiment, the present invention is not limited as such, and a clear fluorescent ink may be printed only on parts of the image printed with the visible color inks.

In accordance with an embodiment of the present invention, referring to the broken line in FIG. 3, a clear fluorescent ink that reflects and emanates light in a specific wavelength range may be discharged only onto the specific visible color ink that reflects light in the specific wavelength range, or it may be discharged over the entire image. For example, to increase the brightness of only magenta (M) parts, the clear fluorescent ink may be discharged only onto dots of magenta (M) visible color ink discharged from the ink head 36M, or the clear fluorescent ink may be discharged over the entire image.

In accordance with an embodiment of the present invention, the visible color inks and the clear fluorescent ink are discharged sequentially onto the medium carried forward from an original position. However, in another embodiment, the present invention is not limited to such a configuration. For example, CMYK visible color inks may first be discharged from nozzle arrays of the ink heads 36C, 36M, 36Y and 36K onto a medium carried forward from the original position. An ultraviolet ray may then be radiated from the ultraviolet lamps 34R and 34L onto the discharged CMYK visible color inks to ultraviolet-cure the CMYK visible color inks. Next, the medium may be returned to the original position and the clear fluorescent ink may be discharged from the nozzle array of the ink head 36F onto the visible color inks cured on the medium, and an ultraviolet ray may be radiated from the ultraviolet lamps 34R and 34L onto the discharged clear fluorescent ink to ultraviolet-cure the clear fluorescent ink.

In accordance with an embodiment of the present invention, the nozzle arrays of each of the ink heads 36C, 36M, 36Y and 36K are sequentially disposed in order in a line along the primary scanning direction without any offset to the fore or rear in the auxiliary scanning direction, and the nozzle array of the ink head 36F is placed offset to the fore in the auxiliary scanning direction relative to the nozzle arrays of each of the ink heads 36C, 36M, 36Y and 36K. However, in another embodiment, the arrangement of the nozzle arrays of the ink heads 36C, 36M, 36Y, 36K and 36F is not limited as such, and the nozzle arrays may be arranged in a manner as shown in FIG. 4(*a*), 4(*b*) or 4(*c*), for example.

Figure 4:
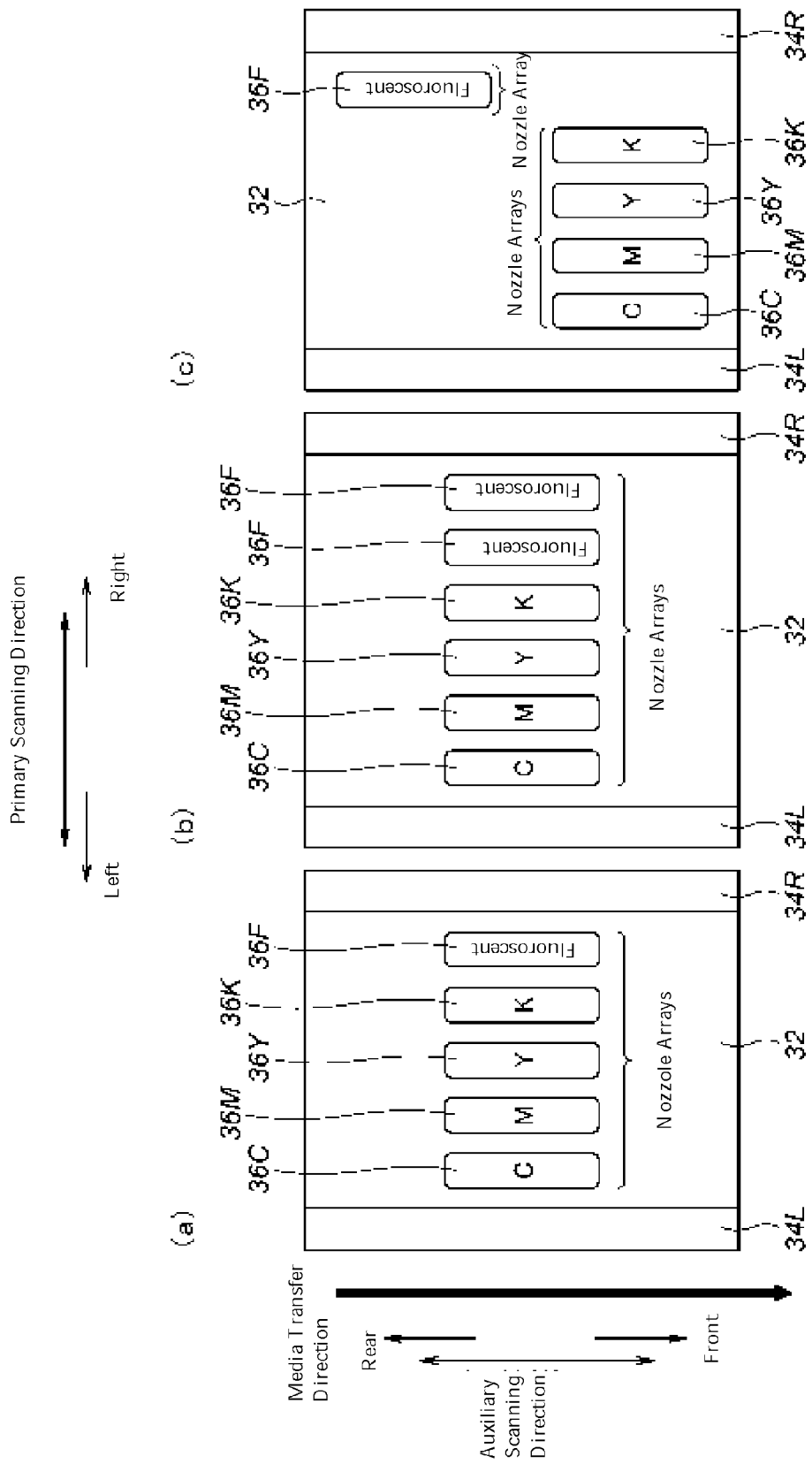
FIG. 4 illustrates schematic diagrams of modifications of an ink head arrangement in an inkjet printer in accordance with an embodiment of the present invention.

In the arrangement of nozzle arrays shown in FIG. 4(*a*), the nozzle arrays of the ink heads 36C, 36M, 36Y, 36K, 36F are sequentially disposed in order from the left side in the primary scanning direction in a line along the primary scanning direction without any offset to the fore or rear in the auxiliary scanning direction. Accordingly, the CMYK visible color inks and the clear fluorescent ink may be discharged at the same time when printing, so that the visible color inks and the clear fluorescent ink mix with each other on a medium before they cure. Alternatively, in the arrangement shown in FIG. 4(a), the CMYK visible color inks may first be discharged on a medium carried forward from the origin to create an image, then the medium may be returned to the direction opposite of the medium carriage direction, i.e., to the rear in the auxiliary scanning direction, and then printing with only the clear fluorescent ink may be performed.

In the arrangement shown in FIG. 4(b), two ink heads 36F for clear fluorescent ink are placed in an arrangement similar to the arrangement in FIG. 4(a). Thus, two nozzle arrays of the ink heads 36F for clear fluorescent ink are provided. The same clear fluorescent ink may be discharged from each of the two nozzle arrays of the two ink heads 36F. As such, the time for printing with the clear fluorescent ink can be shortened. Alternatively, different types of clear fluorescent inks may be discharged from each ink head 36F. For example, a clear fluorescent ink that reflects and emanates light in the same wavelength range as the magenta (M) visible color ink may be discharged from the nozzle array of one of the ink heads 36F, while a clear fluorescent ink that reflects and emanates light in the same wavelength range as the yellow (Y) visible color ink may be discharged from the nozzle array of the other ink head 36F. Moreover, the number of the ink heads 36F for the clear fluorescent ink is not limited to two as shown in FIG. 4(b), but may be three or more.

In the arrangement shown in FIG. 4(c), the nozzle arrays of the ink heads 36C, 36M, 36Y and 36K are sequentially disposed in order in a line along the primary scanning direction without any offset to the fore or rear in the auxiliary scanning direction, but the nozzle array of the ink head 36F is placed offset to the rear in the auxiliary scanning direction relative to the nozzle arrays of each of the ink heads 36C, 36M, 36Y and 36K.

To print with the arrangement shown in FIG. 4(c), the clear fluorescent ink may first be discharged from the nozzle array of the ink head 36F onto a medium carried forward in the auxiliary scanning direction from an original position, and an ultraviolet ray may be radiated from the ultraviolet lamps 34R and 34L onto the discharged clear fluorescent ink to ultraviolet-cure the clear fluorescent ink. When the nozzle arrays of the ink heads 36C, 36M, 36Y and 36K are positioned over the clear fluorescent ink cured on the medium as the medium is carried forward in the auxiliary scanning direction, the visible color inks are discharged from the nozzle arrays of the ink heads 36C, 36M, 36Y and 36K onto the clear fluorescent ink cured on the medium. Thereafter, an ultraviolet ray is radiated from the ultraviolet lamps 34R and 34L onto the discharged visible color inks to ultraviolet-cure the visible color inks. This type of printing can be used, for example, when printing a negative image on transparent media.

In accordance with an embodiment of the present invention, ultraviolet curable ink is used and the ultraviolet lamps 34R and 34L are placed at both ends of the ink head holder 32, such that an ultraviolet ray can be radiated on inks discharged onto media from the ink heads 36C, 36M, 36Y, 36K, 36F. However, in another embodiment, the inks discharged from the ink heads 36C, 36M, 36Y, 36K and 36F may not be ultraviolet curable inks. Furthermore, in another embodiment, the lamps 34R and 34L are not necessarily both ultraviolet lamps. Accordingly, one of the lamps may be an ultraviolet lamp while the other is a non-ultraviolet lamp, even when the inks discharged from the ink heads 36C, 36M, 36Y, 36K and 36F are ultraviolet curable inks.

In accordance with an embodiment of the present invention, a paper moving type inkjet printer is used. However, in another embodiment, a flatbed type inkjet printer may be used.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An inkjet printer for printing an image on a medium, the inkjet printer comprising:
   an inkjet head for discharging each of a plurality of visible color inks onto a medium and discharging at least one fluorescent ink onto only portions of the medium when printing an image onto the medium, such that at least a first visible color ink of the plurality of visible color inks is discharged onto the portions of the medium onto which the at least one fluorescent ink is discharged, and at least a second visible color ink of the plurality of visible color inks is not discharged onto the portions of the medium onto which the at least one fluorescent ink is discharged,
   wherein the plurality of visible color inks reflect light at respective wavelength ranges of the visible color inks, and
   wherein the at least one fluorescent ink reflects light at a wavelength range that is the same as a wavelength range of the at least a first visible color ink of the plurality of visible color inks.

2. The inkjet printer of claim 1, wherein the plurality of visible color inks comprises:
   cyan visible color ink;
   magenta visible color ink;
   yellow color ink; and
   black color ink.

3. The inkjet printer of claim 1, wherein the at least one fluorescent ink reflects light at each of the respective wavelength ranges of the plurality of visible color inks, except the wavelength range of the at least a second visible color ink.

4. The inkjet printer of claim 1, wherein the at least one fluorescent ink reflects light at a wavelength range that is the same as only the wavelength range of the at least a first visible color ink.

5. The inkjet printer of claim 1, wherein the at least one fluorescent ink comprises a transparent fluorescent ink or a colored fluorescent ink.

6. The inkjet printer of claim 1, wherein when printing the image onto the medium, the plurality of visible color inks and the at least one fluorescent ink are discharged at the same time.

7. The inkjet printer of claim 1, wherein the plurality of visible color inks and the at least one fluorescent ink are ultraviolet curable inks.

8. A method for printing an image on a medium, the method comprising:
   discharging each of a plurality of visible color inks onto a medium and discharging at least one fluorescent ink onto only portions of the medium when printing an image onto the medium, such that at least a first visible color ink of the plurality of visible color inks is discharged onto the portions of the medium onto which the at least one fluorescent ink is discharged, and at least a second visible color ink of the plurality of visible color inks is not discharged onto the portions of the medium onto which the at least one fluorescent ink is discharged, wherein the plurality of visible color inks reflect light at respective wavelength ranges of the visible color inks, and wherein the at least one fluorescent ink reflects light at a wavelength range that is the same as a wavelength range of the at least a first visible color ink of the plurality of visible color inks.

9. The method of claim 8, wherein the plurality of visible color inks comprises:
cyan visible color ink;
magenta visible color ink;
yellow color ink; and
black color ink.

10. The method of claim 8, wherein the at least one fluorescent ink reflects light at each of the respective wavelength ranges of the plurality of visible color inks, except the wavelength range of the at least a second visible color ink.

11. The method of claim 8, wherein the at least one fluorescent ink reflects light at a wavelength range that is the same as only the wavelength range of the at least a first visible color ink.

12. The method of claim 8, wherein the at least one fluorescent ink comprises a transparent fluorescent ink or a colored fluorescent ink.

13. The method of claim 8, wherein printing the image onto the medium comprises:
discharging the plurality of visible color inks and the at least one fluorescent ink at the same time.

14. The method of claim 8, wherein the plurality of visible color inks and the at least one fluorescent ink are ultraviolet curable inks.

15. An inkjet printer for printing an image on a medium, the inkjet printer comprising:
an inkjet head for discharging each of a plurality of visible color inks onto a medium and discharging at least one fluorescent ink onto only portions of the medium when printing an image onto the medium, such that at least a first visible color ink of the plurality of visible color inks is discharged onto the portions of the medium onto which the at least one fluorescent ink is discharged, and at least a second visible color ink of the plurality of visible color inks is not discharged onto all of the portions of the medium onto which the at least one fluorescent ink is discharged, wherein the plurality of visible color inks reflect light at respective wavelength ranges of the visible color inks, and wherein the at least one fluorescent ink reflects light at a wavelength range that is the same as a wavelength range of the at least a first visible color ink of the plurality of visible color inks.

\* \* \* \* \*